Aug. 12, 1952     C. C. RAINES     2,606,442
FLEXIBLE AND EXTENSIBLE MEMBRANE
Filed July 31, 1947
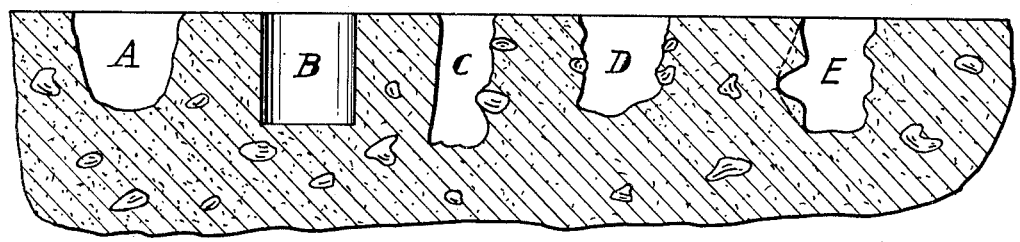
Fig.1
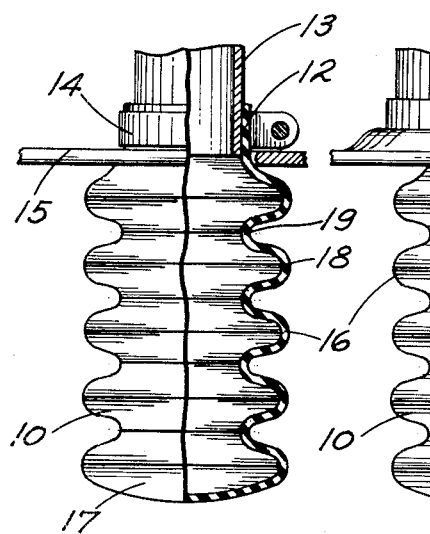
Fig.2    Fig.3
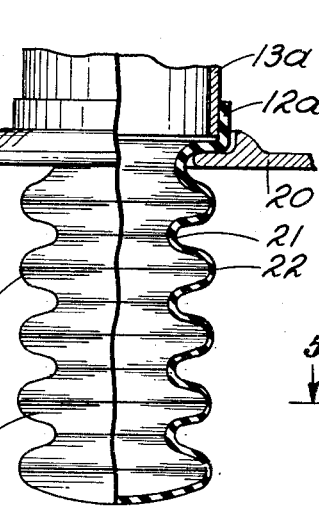
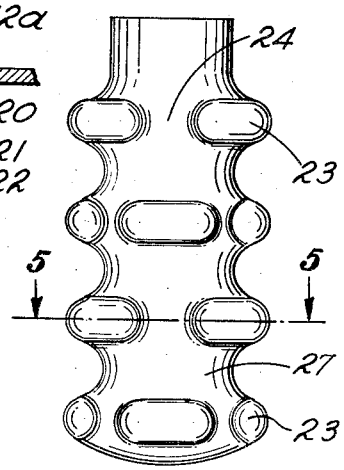
Fig.4
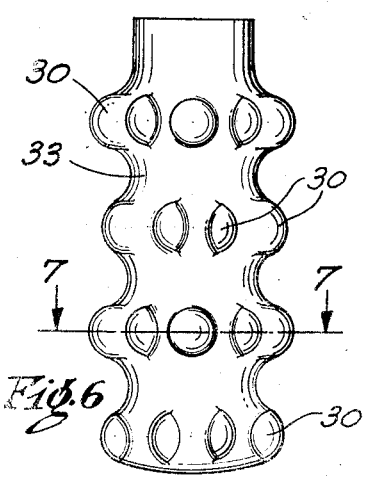
Fig.6
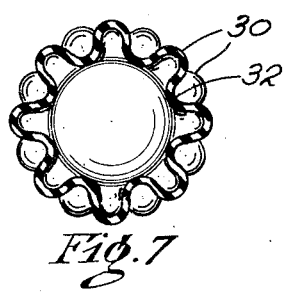
Fig.7
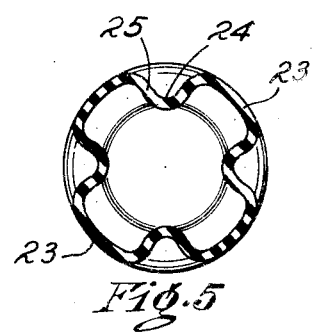
Fig.5
INVENTOR.
CHARLES C. RAINES
BY
Bosworth & Sessions
ATTORNEYS Patented Aug. 12, 1952

2,606,442

UNITED STATES PATENT OFFICE 2,606,442

FLEXIBLE AND EXTENSIBLE MEMBRANE

Charles C. Raines, Austin, Tex., assignor to Rainhart Company, Austin, Tex., a partnership composed of Charles C. Raines and Don A. Hart Application July 31, 1947, Serial No. 765,205

6 Claims. (Cl. 73—149)

This invention relates to an envelope in the form of a flexible and extensible membrane and more particularly to one used to determine the volume of a test hole, frequently of irregular contour, in earth measurements and the like.

A standard way of making such measurements is to place an envelope, commonly called a balloon, with a wall in the form of a flexible and extensible membrane, into the hole whose volume is to be measured after which the balloon is filled with fluid under pressure, preferably water, to expand it as closely as possible into conformation with the sides and bottom of the hole. The measurement of hole volume is made by determining the volume of water required to fill the balloon when it in turn fills the hole. Balloons as formerly used have been subject to disadvantages when placed in use because they did not expand evenly to conform closely to the surface of the hole, particularly if the hole surface was uneven due to the projection into it or removal from it of relatively large pieces of aggregate.

The balloon or envelope used prior to the present invention was a simple member that ordinarily started to expand toward the wall of the hole at the point where its cross section was weakest when subjected to expansion pressure. As this pressure increased and expansion of the envelope wall or membrane extended over the entire surface a portion that already was in contact with the side of the hole might be unduly stretched or even forced to slide across the surface of the hole with resultant abrasion that sometimes punctured the membrane and destroyed the balloon.

A general object of the present invention is to provide an improved envelope or balloon that may readily be expanded to fit the surface of the hole undergoing measurement. Another object is to provide an envelope or balloon that is more freely extensible along its length, with an action similar to extension of a bellows, than across its diameter. A further object is to provide an envelope or balloon with convolutions or protuberances spaced from each other in predetermined fashion whose outer portions first move out to contact the side of the hole when expansion pressure is first established in the balloon; leaving between them relatively less stretched parts of the membrane that in turn may move out until the entire envelope conforms to the surface of the hole. A still further object is to provide a series of outwardly extending convolutions or protuberances on the surface of the membrane so that an excess of internal pressure in the balloon causes it to assume such a shape as to distribute the surface of membrane available for expansion approximately equally along the sides of the hole from the top to the bottom. Other objects of the invention will become apparent from the following specification and the accompanying drawings while the novel features thereof are summarized in the claims.

In said annexed drawings: Figure 1 is a diagram showing the cross-sectional contours of some of the various types of holes whose volume is to be determined; Figure 2 is partially a side elevation and partially a cross section through the center axis of one form of envelope embodying the present invention, the side wall or membrane thickness being considerably exaggerated; Figure 3 is a fragmentary axial section showing an envelope wall of varying cross-sectional thickness, such thickness again being exaggerated, and a modified form of neck construction; Figure 4 is a side elevation illustrating a modified form of the invention; Figure 5 is a section through Figure 4 as indicated by the lines 5—5 thereon; Figure 6 also is a view similar to Figure 4 showing a further modified form of the invention; and, Figure 7 is a section through Figure 6 as indicated by the lines 7—7 thereon.

The present invention is primarily adapted for measuring the volume of holes of various shapes and cross-sectional configurations as illustrated in Figure 1. In that figure an irregular hole of shallow depth is shown at A as contrasted with cylindrical hole B made with a sleeve cutter or auger in a material that is substantially free from hard aggregate and that may be drilled. The holes indicated at C and D represent a common type in which relatively large pieces of aggregate may project into the hole to give it an uneven surface contour. Such projecting aggregate may present sharp points or rough surfaces that abrade and even puncture a membrane surface that engages them in the manner of prior art structures. The hole indicated at E illustrates how a horizontally extending cavity may result if a large piece of aggregate is removed and in this case the hole normally is undercut as indicated by the dotted line to smooth the surface contour somewhat. Balloons or envelopes made in accord with the present invention may accurately conform to the contour of any of the holes described above without being unduly stressed or abraded and without puncturing the membrane wall.

A balloon or envelope embodying the present invention preferably will have a generally cylindrical form when expanded to its own undistorted shape and before it is further expanded and stretched to conform to the shape of the hole in which it may be placed although other shapes such as globular, ellipsoidal, conical or spherical or combinations of portions of such shapes with cylindrical sections are considered to be within the scope of this invention. In any event the convolutions or protuberances extend outwardly from more or less defined inner surfaces as distinguished from pouches that extend inwardly from an outer surface.

Such an envelope, balloon or bag consists effectively of a single layer of material, made commonly by dipping, spraying, or otherwise coating a form or mold with a solution, latex, or other form of the material which forms the membrane when hardened or vulcanized. Other usual methods of manufacture may also be employed. Although rubber is a preferred material for this purpose it will be understood that certain other materials such as synthetic rubbers of various kinds may be employed as long as they are sufficiently flexible to conform to the holes in which they are to be placed. The membranes from which all forms of balloons embodying the present invention are made normally will be from two thousandths to one-tenth of an inch in thickness with the best results obtained in a thickness range between ten and twenty thousandths of an inch for balloons to be used in fairly small holes.

The invention embodies a balloon which is freely extensible lengthwise along its major axis and that in use drops to the bottom of the hole before any great amount of hydrostatic pressure is applied to its interior. This pressure may be applied in one of several ways and the apparatus by which it is accomplished forms no part of the present invention. A simple liquid column may be positioned over the hole and in communication with the interior of the balloon which is secured at the underside of the column. As the hydrostatic pressure due to water or other fluid in the balloon builds up at the time the envelope touches the bottom of the hole it first evenly space the protuberances or convolutions vertically in accord with the spacing they were given when originally molded. This vertical spacing of the convolutions results from the tensile forces in the membrane itself causing the balloon to assume a shape of minimum external surfaces thereby reducing the over-all area by having equally spaced convolutions.

The amount of fluid, preferably a liquid such as water, that is required to fill the interior of the balloon to make it conform to the volume of the hole may then be measured by determining how much liquid is removed from the column to fill the balloon; this amount, plus the volume of the balloon material, equals the volume of the hole. Ordinarily this measurement is made with an incompressible fluid of moderate density so the hydrostatic forces involved are greater than the weight of the balloon and the forces due to minor variations in the stiffness of its component material. When the measurement is completed the fluid within the balloon is removed after which the balloon itself may be removed from the hole.

Referring now to Figure 2 one form of the invention is shown as embodying a balloon or envelope 10 in the form of a bellows open at one end and closed at the other. At the open end it is provided with a neck 12 that is fitted over a corresponding neck 13 of the measuring column or cylinder to the underside of which it is secured, attachment being accomplished by a removable ring 14. Although this method of securing the balloon in place is simple and effective, it will be evident that various other means for clamping or otherwise attaching the balloon may be employed with various forms of accessory equipment, including forms in which the so-called neck of the balloon is larger in diameter than any portion of the rest of the balloon, without departing from the scope of the invention. If desired a plate 15 may be provided as shown to furnish a reference surface in locating the measuring column with respect to the ground surface at the mouth of the hole.

The balloon comprises a series of projecting convolutions 16 each extending annularly as shown about a central or major axis that is normal to the opening in the neck 12 and substantially in the center of it. No specific number of convolutions is required so long as sufficient flexibility is imparted to the envelope to permit it easily to perform its intended function. The membrane of the envelope forms a closed end 17 that rests on the bottom of the hole and assists in positioning the convolutions prior to their radial expansion. After the end 17 has reached the bottom of the hole the hydrostatic pressure within the envelope is increased and the outer ring portions 18 of the convolutions stretch and expand radially until they contact the side of the hole. As the pressure inside the envelope continues to increase the troughs 19 between these outer rings of the convolutions are forced outwardly until they also contact the side of the hole and the entire surface of the membrane closely conforms to its shape. After the volume of fluid, preferably water, within the envelope 10 has been measured at the time the balloon is so expanded into conformation with the side and bottom of the hole, the fluid is removed through the neck 13 after which the envelope may be withdrawn.

An envelope 10 as illustrated in Figure 2 normally is made by dipping a form whose exterior surface conforms to the interior of the envelope into a vat of some liquid form of rubber or other material which then hardens to form the membrane of the completed product after which this product is stripped from the form. Several successive dippings may be required depending upon the cross-sectional thickness of membrane that is desired. In so forming the rubber membrane the rubber ordinarily does not distribute itself over the form in a layer of uniform thickness. On the contrary, it tends to accumulate in the troughs at the expense of the outer or peak portions of the convolutions to form a layer of unequal thickness. Thus that part of the membrane that forms the outer extremities of the envelope and is first stretched into contact with the sides of the hole is thinnest. This facilitates expansion of the envelope into contact with the hole sides when its interior is filled with water. Such a membrane construction is illustrated in modified form in Figure 3 in which the envelope is again indicated at 10 and is provided with a series of convolutions 16 and has an enlarged neck portion indicated at 12a. The enlarged neck is adapted to be stretched over a neck 13a of the measuring cylinder. A plate 20 corresponding in function to the plate 15 of Figure 2 is provided as shown.

The membrane is formed by dipping and the convolutions are somewhat thicker at their base adjoining trough 21 than at their outer extremities 22. As stated, advantage is taken of this characteristic because the outer and thinner portions 22 expand more easily than the thicker inner portions 20 into contact with the side walls of the hole under the influence of internal pressure. As the internal pressure increases the thicker inner portions 20 are pushed out and engage the hole surface without being unduly stretched. While this variation in membrane thickness is a feature of the invention I do not limit the scope thereof solely to balloons whose membranes have such variable thickness. Membranes of uniform thickness as shown in Figure 2 are equally included within the invention.

The envelopes or ballons described thus far in connection with Figures 2 and 3 are provided with a series of circumferentially extending convolutions forming continuous rings. While this is a preferred form of construction it is not intended to limit the invention to this membrane form alone. It is contemplated that the annular outwardly protruding parts of the convolutions need not be continuous but may be broken up into a series of segments, knobs or other protuberances that as a whole act substantially as an annular ring or convolution. Preferably the protuberances of one ring are staggered with respect to those of adjacent rings as shown in Figures 4 and 6 in which such modified forms of the invention are illustrated, sections through them being indicated at Figures 5 and 7 respectively.

The modification shown in Figure 4 is one in which the annular convolutions or rings comprise a series of protruding segments 23 each separated from the other annularly by an inner spaced portion 24 as best shown in Figure 5. Each portion 24 is bounded by the inturned end walls 25 of the adjacent segments 23 and each annular series of segments 23 is spaced axially from each other by inner spaced troughs 27 (Figure 4) generally similar either to the troughs 19 of Figure 2 or troughs 21 of Figure 3. In effect the construction provides a series of annular rings outstanding from the generally cylindrical body of the envelope or balloon, such body being more or less defined by the inner parts of portions 24 and 27. In operation the envelope first fills to the form shown in Figure 4 until the hydrostatic pressure within it is great enough to overcome the tensile forces in the membrane itself after which it stretches and expands until the protruding segments 23 engage the side walls of the hole. Thereafter the portions 24 and 27 of the membrane, under the influence of increased pressure, move out until the entire membrane including the bottom 17 is in intimate contact with the surfaces of the hole and closely conforms thereto. At this time the volume of the expanded envelope is measured.

A further modified construction is shown in Figure 6 in which a generally annular convolution is made up of a series of outwardly projecting knobs 30 with the knobs of each annular group separated from the other by inner portions 32. Each such series of knobs is in turn spaced axially from the adjacent series by troughs 33. Again depending upon the uniformity of wall thickness the troughs 33 conform to the troughs 19 or the troughs 21 of Figures 2 or 3 respectively. It is noted that in the event the construction of Figure 3 is employed the portions 33 of the modification of Figure 6 and the portions 24 of the modification of Figure 4 will each also be somewhat thicker than the outer portions 30 and 23 of the respective modifications. As hydrostatic pressure is increased within the construction of Figure 6 it first will assume the shape shown in that figure after which the knobs 30 move outwardly as the membrane is stretched until they contact the sides of the hole. As the pressure continues to be increased the portions 32 and 33 are forced outwardly until the complete membrane conforms to the shape of the hole at which time the volume of the latter may be determined. In this form of balloon the axial spacing between the rows of knobs may be made very small, or the rows may overlap somewhat without losing the desired bellows action along the axis.

From the above description it is seen that the annular convolutions that result in the bellows type construction may each be a continuous annulus extending completely around the envelope or a series of protruding segments or knobs in a series corresponding generally to a continuous convolution. It will also be seen that the convolutions instead of being strictly annular may be arranged in the form of a helix or helices making a relatively small angle to the axis of the balloon. So long as the effect of an annular convolution and resultant bellows action is obtained the precise shape of the protruding portions may be of various forms within the scope of the invention.

A cardinal feature of the present invention is that the convolutions in the membrane extend substantially annularly thereof transverse to and around the major axis as distinguished from convolutions more or less parallel to this axis. Protuberances which have substantial extension along the length of the envelope i. e., parallel to the major axis, operate unfavorably and do not form part of this invention. For this reason certain folding membrane shapes such as those of a football bladder or the longitudinal corrugations in ice bags are undesirable and are specifically disclaimed.

From the foregoing description it will be seen that I have provided an improved form of envelope that may easily be expanded to conform to the wall and bottom surface of irregularly shaped holes to secure increased accuracy of volume determinations with reduced danger of abrading the membrane or piercing it with its resultant destruction.

I claim:

1. In a measuring device having a cylinder, a neck portion on the cylinder, and means for attaching a measuring balloon to the cylinder externally of the neck portion thereof, the improvement which comprises forming the measuring balloon as an elongated extensible membrane with an open neck embracive of the neck portion of the cylinder and a bottom at opposite ends thereof and, between them, a series of convolutions extending more nearly annularly than longitudinally of the axis intersecting said open neck and said bottom, the outer portions of said convolutions having a membrane thickness substantially less than the membrane thickness of the trough-like portions between said convolutions.

2. Apparatus as in claim 1 in which the convolutions in the membrane are continuous.

3. In a measuring device having a cylinder, a neck portion on the cylinder, and means for attaching a measuring balloon to the cylinder externally of the neck portion thereof, the improvement which comprises forming the measuring balloon as an elongated extensible membrane with an open neck embracive of the neck portion of the cylinder and a bottom at opposite ends thereof and, between them, a series of convolutions extending more nearly annularly than longitudinally of the axis intersecting said open neck and said bottom, each of said convolutions comprising a plurality of protuberances spaced circumferentially from each other by a portion of said membrane lying substantially closer to said axis than do said protuberances.

4. In a measuring device having a cylinder, a neck portion on the cylinder, and means for attaching a measuring balloon to the cylinder externally of the neck portion thereof, the improvement which comprises forming the measuring balloon as an elongated extensible membrane with an open neck embracive of the neck portion of the cylinder and a bottom at opposite ends thereof and, between them, a series of convolutions formed in said membrane and extending more nearly annularly than longitudinally of the axis intersecting said open neck and said bottom to form a substantially bellows-like envelope with each convolution comprising a plurality of protuberances spaced circumferentially from each other by a portion of said membrane lying substantially closer to said axis than do said protuberances, the outer portions of said convolutions having a membrane thickness substantially less than the membrane thickness of the trough-like portions between said convolutions.

5. In a measuring device having a cylinder, a neck portion on the cylinder, and means for attaching a measuring balloon to the cylinder externally of the neck portion thereof, the improvement which comprises forming the measuring balloon as an elongated extensible membrance with an open neck embracive of the neck portion of the cylinder and a bottom at opposite ends thereof and, between them, a series of generally annular convolutions, each of said convolutions comprising a plurality of substantially spherical protuberances spaced circumferentially from each other by a portion of said membrane lying substantially closer to the longitudinal axis of the series than do said protuberances.

6. In a measuring device having a cylinder, a neck portion on the cylinder, and means for attaching a measuirng balloon to the cylinder externally of the neck portion thereof, the improvement which comprises forming the measuring balloon as an elongated extensible membrane with an open neck embracive of the neck portion of the cylinder and a bottom at opposite ends thereof and, between them, a series of generally annular convolutions, each of said convolutions comprising a plurality of circumferentially elongated protuberances spaced circumferentially from each other by a portion of said membrane lying substantially closer to the longitudinal axis of the series than do said protuberances.

CHARLES C. RAINES.

REFERENCES CITED

The following references are of record in the file of this patent:

UNITED STATES PATENTS

| Number | Name | Date |
|---|---|---|
| 1,691,441 | Kennedy | Nov. 13, 1928 |
| 1,852,897 | Price | Apr. 5, 1932 |
| 2,119,495 | Spanel | May 31, 1938 |
| 2,119,499 | Spanel | May 31, 1938 |
| 2,186,183 | Trumbull | Jan. 9, 1940 |
| 2,193,069 | Krueger | Mar. 12, 1940 |
| 2,225,764 | Beal | Dec. 24, 1940 |
| 2,270,505 | Burleson | Jan. 20, 1942 |
| 2,314,540 | Huntington | Mar. 23, 1943 |
| 2,384,056 | Tritt | Sept. 4, 1945 |
| 2,430,905 | Bradley | Nov. 18, 1947 |

FOREIGN PATENTS

| Number | Country | Date |
|---|---|---|
| 571,403 | France | Feb. 1, 1924 |

OTHER REFERENCES

Page 280 (Fig. 23 and description thereof) of Public Roads, vol. 22, No. 12, published Feb. 1942 for the U. S. Bureau of Public Roads by the Govt. Printing Office.